June 26, 1956 D. F. PINKERTON 2,751,977
ONE MAN AUTOMOBILE COVER
Filed Oct. 24, 1952 2 Sheets-Sheet 1
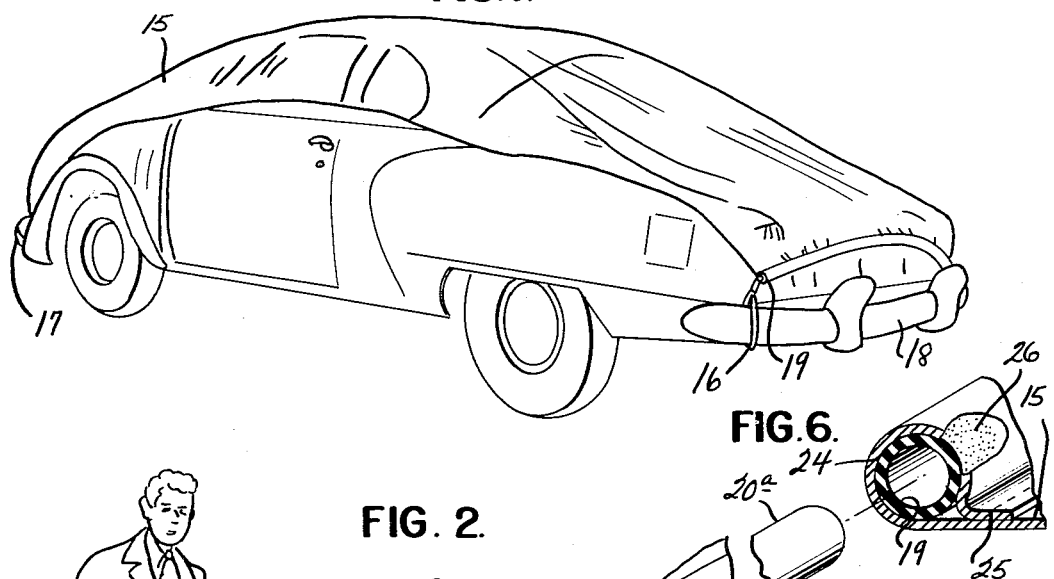
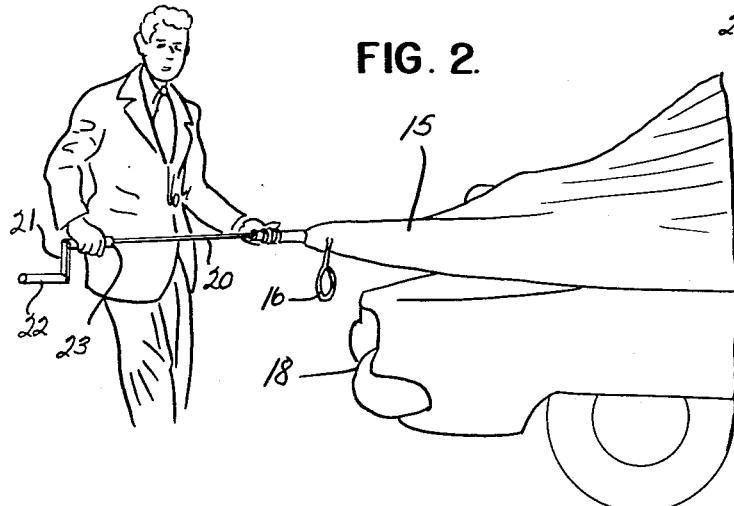
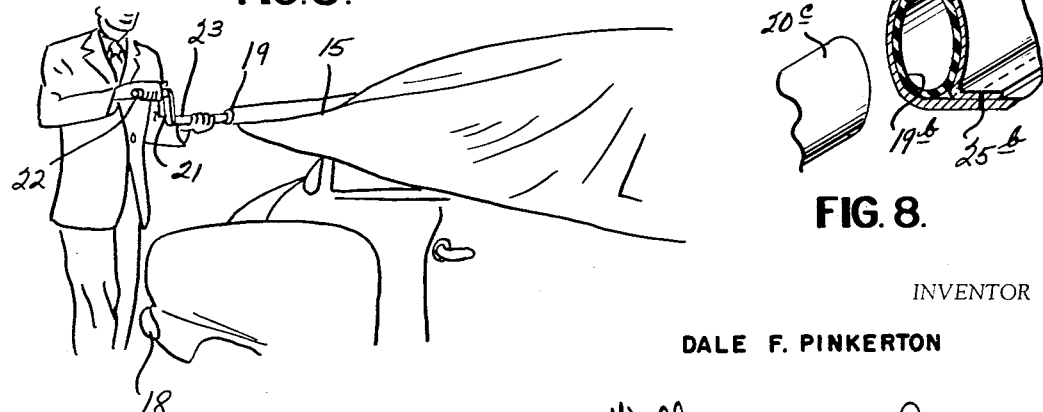
INVENTOR
DALE F. PINKERTON
BY Wilkinson & Mawhinney
ATTORNEYS June 26, 1956  D. F. PINKERTON  2,751,977
ONE MAN AUTOMOBILE COVER
Filed Oct. 24, 1952  2 Sheets-Sheet 2
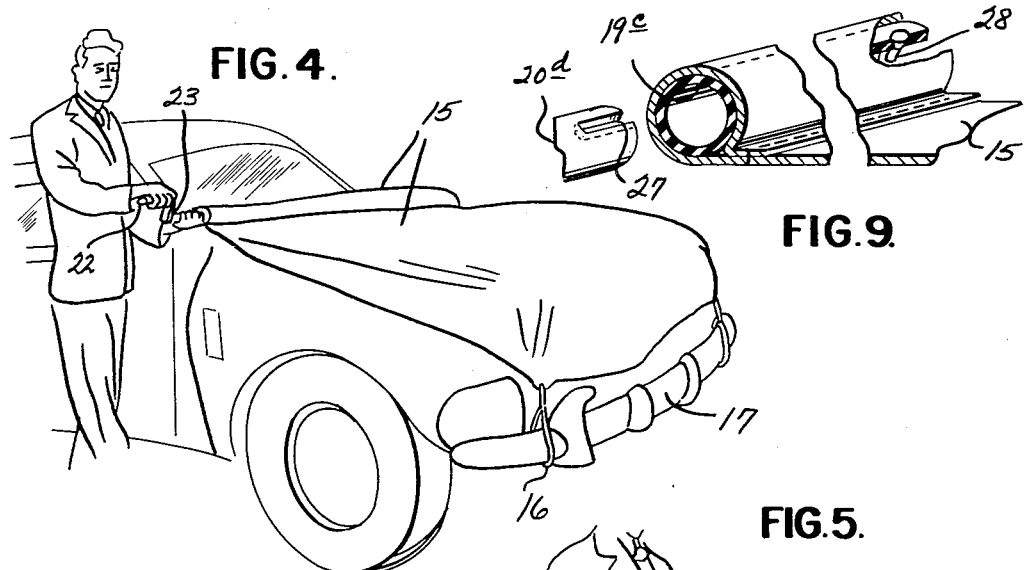
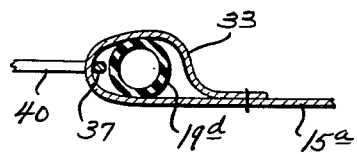
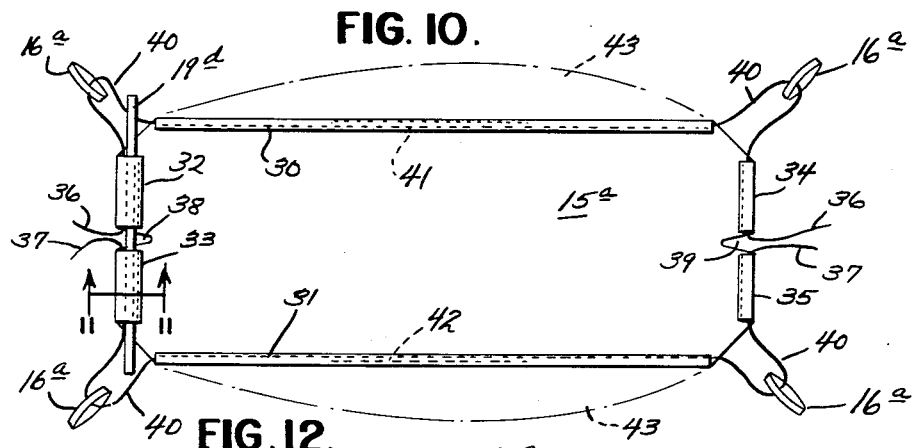
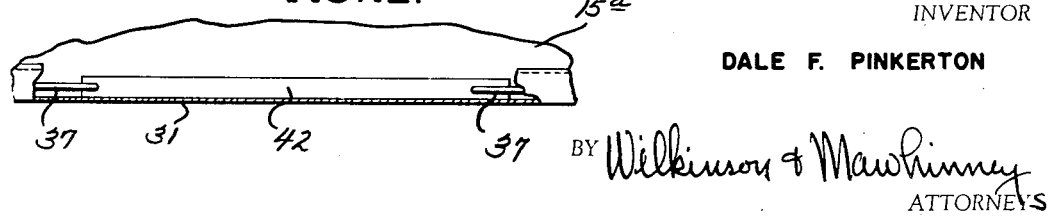
INVENTOR
DALE F. PINKERTON
BY Wilkinson & Mawhinney
ATTORNEYS United States Patent Office 2,751,977
Patented June 26, 1956

2,751,977
ONE MAN AUTOMOBILE COVER
Dale F. Pinkerton, Fort Collins, Colo.
Application October 24, 1952, Serial No. 316,670
1 Claim. (Cl. 160—368)

The present invention relates to improvements in one man automobile cover and has for an object to provide, in combination with a flexible cover for an automobile, a device to enable the cover to be easily and quickly placed over the automobile and quickly and easily removed therefrom and folded into a small bundle, all by a single person working from one side only of the vehicle.

The old method of covering an automobile is not regularized but consists principally in drawing the cover over the car and then walking around and around the vehicle pulling the cover into place. This method is so time consuming and difficult that few bother to cover their automobiles, even though the deterioration of paint in the sunshine and weather rapidly reduces the value and the appearance of the automobile.

A further object of the invention is to dispense with previous difficulties in placement and removal of protective covers for automobiles by a cheaply manufactured and installed device which also forms a convenient means on which the cover may be rolled to preserve the appearance of the cover and to enable the cover and such means to be folded for stowage in the automobile trunk or other convenient space.

With the foregoing and other objects in view, the invention will be more fully described hereinafter, and will be more particularly pointed out in the claim appended hereto.

In the drawings, wherein like symbols refer to like or corresponding parts throughout the several views.

Figure 1 is a perspective view taken from the rear of an automobile showing in position thereon a one man automobile cover constructed in accordance with the present invention;

Figure 2 is a fragmentary perspective view of the rear portion of the vehicle illustrating the application of the crank as the first step in the removal of the cover;

Figure 3 is a similar view showing the crank inserted and the roll-up operation started;

Figure 4 is a fragmentary perspective view of the front portion of the automobile showing the roll-up operation having proceeded to the hood of the car;

Figure 5 is a fragmentary perspective view of the cover as completely rolled, removed from the vehicle and folded, with the crank shaft disjointed and the cover and crank ready for stowage;

Figure 6 is an exploded perspective view, with parts broken away and parts shown in section, of one form of flexible tube and crank shaft and illustrating one method of mounting the tube to the automobile cover;

Figure 7 is a similar view showing a modified form of the invention in which the tube and crank are of a square cross section;

Figure 8 is a similar view showing an oval form of tube and shank;

Figure 9 is a similar view showing a pin and slot form of connection between the tube and shank;

Figure 10 is a plan view of a modified form of construction;

Figure 11 is a cross section taken on an enlarged scale on the line 11—11 of Figure 10; and Figure 12 is a fragmentary longitudinal section taken on an enlarged scale through one of the side casings of the cover showing the rubber strip.

Referring more particularly to the drawings and for the present to Figures 1 to 9, inclusive, 15 represents a flexible cover which may be of any desired size and shape to protectively cover the automobile. The cover may be of cloth or fabric, treated or otherwise and rain and weather proof if desired. It may be of general rectangular form for the purpose of properly enveloping the upper portion, at least, of the vehicle.

At each corner of the cover 15 is fastened an elastic loop 16 so that there are four such loops which are made preferably of rubber. These loops 16 may be slipped over any convenient projection on the automobile such as the ends of the front and rear bumpers 17 and 18.

Across one end of the cover is fastened a flexible tube 19, such as a section of common rubber garden hose. This tube 19 serves several purposes, one of which is that it serves as a base on which to roll the cover as it is removed from the automobile. A second purpose is to receive the crank shaft 20, 20$^a$ of a crank which also comprises the crank arm 21 and crank handle 22. The shank section 20, 20$^a$ may be of any suitable cross section and may be disjointable or otherwise collapsible but rigid when extended in a single axial line, in which operative form the shank fits into the tube 19 by a wedging action so as to compel rotation of the tube 19 with the crank. Other means than the wedging action may be employed to make the shank 20, 20$^a$ temporarily fast to the tube 19. Since the crank is rigid when in place in the tube and is of sufficient length to reach across the automobile a man may, by holding one end and turning the crank, unroll or roll the cover into or out of its proper position on the automobile. As shown in Figure 3, the operator's right hand is gripping the crank handle 22 while his left hand holds the crank journal 23, which may for convenience, be an enlarged diameter of the crank adjacent the crank arm 21. This journal portion 23 does not enter the tube 19.

Referring more particularly to Figure 6, the tube 19 is shown as assembled to the cover 15 by inserting the tube within a casing or hem 24 provided by the line of stitching 25. The tube 19 may be made fast within the casing 24 as by cement or adhesive 26, or other means. The shank section 20$^a$ will be of a diameter to wedge into the rubber hose 19 which, due to its inherent resiliency, is radially expansible and will thus frictionally grip the shank 20$^a$ compelling the tube 19 to rotate with the crank. To permit this radial expansion of the tube 19, the casing 24 may be slightly larger than the outside diameter of the tube 19. So as not to interfere with this radial expansion, the cement or adhesive 26 may be confined to a rather narrow angular area.

Referring more particularly to Figure 7, a square form of tube 19$^a$ is illustrated mounted in a casing or hem 24$^a$ formed by the line of stitching 25$^a$. In this case the cement or adhesive 26$^a$ may or may not be needed as the square form of the tube cannot readily turn in the casing 24$^a$. In this instance the casing 24$^a$ is preferably made so as to rather closely fit the outside surface walls of the square or rectangular tube 19$^a$. A square form of crank shaft 20$^b$ may be employed to cooperate with the square tube 19$^a$ so as to definitely entrain the tube to rotate with the crank.

Referring more particularly to Figure 8, the tube 19$^b$ is oval in cross section and the casing 24$^b$ will assume this oval form when the tube is inserted therein. The stitching is shown at 25$^b$ and an oval cross sectional form of shank 20$^c$ is preferably employed.

Referring more particularly to Figure 9, the tube 19c may be made fast to the driving crank shaft 20d by a pin 28 and slot 27 connection between these two parts. In the instance as shown the pin 28 is carried by the tube 19c and projects into the internal bore of the tube while the slot 27 is made in the shank 20d and opens through its leading end and through its outside cylindrical surface. When the shank 20d, which may be of somewhat inferior external diameter as compared to the inside diameter of the tube 19c, enters into the tube 19c it is pushed axially along until arrested by the pin 28 whereupon rotary movement of the shank 20d will enable the slot 27 to find the pin 28, whereupon further axial movement of shank 20d will enter the pin 28 into the slot 27, forming a driving connection by which the tube 19c will rotate with the crank and of course roll along at the same time due to its entrainment in the cover 15.

In the use of the device, with the cover in place on the automobile as shown in Figure 1, the following is the cycle of operation:

(a) The folding or collapsible crank shaft 20, 20a is straightened out, extended or assembled like a fish rod, and inserted into the proper end of the rubber tube. This may be either end but for a right hand man it is the end of the tube at the right rear end of the vehicle. The shank is pushed firmly into the tube so that it straightens out the tube and in the case of the round tube it becomes wedged or otherwise affixed therein.

(b) The rubber loops 16 are removed from the ends of the rear bumper 17.

(c) By using the crank in both hands the cover is rolled up on the tube 19 as the operator moves along the side of the car from the rear to the front.

(d) When the cover is completely rolled up the rubber loops 16 are removed from the bumper ends of the front end of the car.

(e) The crank is now pulled out of the rubber tube 19.

(f) Since the rubber tube 19 is flexible the rolled up cover may now be folded into a smaller bundle in order to fit into the automobile trunk or other storage. This condition is illustrated in Figure 5.

(g) The crank is also folded or disassembled or collapsed and stowed.

In placing the cover on the automobile the sequence of operations is:

(a) The cover bundle is unfolded until the rubber tube 19 is approximately in a straight line.

(b) The crank is straightened out or assembled and inserted into the rubber tube.

(c) The rolled cover is laid across the front end of the car so that the front bumper loops 16 may be put into place on the ends of the front bumper 17.

(d) The cover is now unrolled by the operator walking toward the rear of the car and turning the crank.

(e) When the cover is completely unrolled the crank is withdrawn, collapsed or folded and placed in the car trunk.

(f) The rubber loops 16 at the tube end of the cover are then slipped over the rear car bumper ends fastening the cover in place.

The advantages of the invention are:

(a) The cover is quickly manipulated by one man without walking around the automobile.

(b) The cover and manipulating crank are designed so that they may be folded into small enough bundles to be placed in the automobile trunk.

The crank may be made collapsible in any number of well known manners. It may be hinged in one or more places, it may be jointed as is a fish rod with "slide in" ferrules or it may be telescopic, as a few examples.

As illustrated and heretofore described, the crank may temporarily fasten to the rubber tube 19 in various ways, and the tube may be fastened at various places on the cover 15 rather than across the rear end.

The novel features of the invention are believed to be:

(a) The use of a flexible tube fastened to an automobile cover upon which the cover is unrolled.

(b) The use of a crank, operated from one side, to roll up and unroll, an automobile cover.

As shown more particularly in Figure 4, the hood of the car serves as a convenient place to complete the roll up operation. For instance, after the operator arrives at the position of Figure 4 or at any time thereafter he may detach the front loops 16 and roll up the remainder of the cover 15 using the hood of the vehicle as a supporting surface.

As an alternative operation in placing the cover on the car the crank does not need to be turned. If the shank is placed loosely in the tube, the cover unrolls itself as the operator moves to the rear of the car.

Referring more particularly to Figures 10, 11 and 12, the cover 15a is shown to be made with longitudinal casings or hem 30 and 31 and divided transverse casings or hems 32, 33 and 34, 35 through which adjustment cords 36 and 37 are slidably threaded with the free ends of the cords brought out for tying at the slots 38 and 39. At the corner portions of the cover 15a where the adjustment cords 36, 37 emerge from the casings, such cords are drawn out into loops 40 with which the rubber loops 16a are engaged. Rubber or other elastic strips 41, 42 are slidably mounted in the longitudinal casings 30, 31 and are included in the adjustment cords as a part thereof. The flexible tube 19d is shown as inserted through the transverse casing at one end of the cover. The broken lines 43 indicate an alternate shape for the cover.

The adjustment cords 36, 37 may be pulled up and tied at each end after the cover is placed on the car the first time. The elastic or rubber strips 41, 42 will be distended to permit the loops 16a to be pulled out from the bumper ends, such elastic strips 41, 42 contracting to hold the loops 16a tightly in place on the bumper ends.

Although I have disclosed herein the best form of the invention known to me at this time, I reserve the right to all such modifications and changes as may come within the scope of the following claim.

What I claim is:

A protection for automobiles comprising a flexible cover having transverse end casings with open corner portions, said transverse casings being divided transversely thereof, cords slidably threaded through said casings and formed into projecting loops at the exposed corner portions of the cover, the ends of the cords projecting from the division points of the transverse casings and being accessible for tying, and elastic members provided on said loops.

References Cited in the file of this patent

UNITED STATES PATENTS

| 378,039 | Campbell | Feb. 14, 1888 |
| 579,373 | Wolbrecht | Mar. 23, 1897 |
| 740,920 | Rees | Oct. 6, 1903 |
| 984,473 | Cornelius | Feb. 14, 1911 |
| 1,071,158 | Hurlbut | Aug. 26, 1913 |
| 1,260,831 | Terry | Mar. 26, 1918 |
| 1,467,523 | Andlauer | Sept. 11, 1923 |
| 1,569,577 | Robinson | Jan. 12, 1926 |
| 1,912,231 | Wandscheer | May 30, 1933 |
| 2,065,242 | Ornerly | Dec. 22, 1936 |
| 2,248,655 | Bila | July 8, 1941 |

FOREIGN PATENTS

| 25,993 | Great Britain | Nov. 28, 1903 |
| 501,332 | Great Britain | Aug. 25, 1938 |